(12) United States Patent
Schmid et al.

(10) Patent No.: US 6,314,356 B1
(45) Date of Patent: Nov. 6, 2001

(54) METHOD FOR CONTROLLING AN AUTOMATIC TRANSMISSION

(75) Inventors: Wolfgang Schmid, Langenargen; Gerhard Eschrich, Friedrichshafen, both of (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/509,247

(22) PCT Filed: Sep. 28, 1998

(86) PCT No.: PCT/EP98/06128

§ 371 Date: Mar. 23, 2000

§ 102(e) Date: Mar. 23, 2000

(87) PCT Pub. No.: WO99/18371

PCT Pub. Date: Apr. 15, 1999

(30) Foreign Application Priority Data

Oct. 2, 1997 (DE) .............................................. 197 43 743

(51) Int. Cl.⁷ ...................................................... G06F 17/00
(52) U.S. Cl. .............................. 701/51; 701/22; 701/113; 123/685
(58) Field of Search ................................ 701/22, 51, 52, 701/101, 103, 105, 113; 123/685, 686

(56) References Cited

U.S. PATENT DOCUMENTS

| 4,907,475 | 3/1990 | Holbrook . |
|---|---|---|
| 5,069,084 | 12/1991 | Matsumo et al. . |
| 5,184,463 | * 2/1993 | Becker et al. . |
| 5,319,963 | 6/1994 | Benford . |
| 5,588,411 | * 12/1996 | Kreuter et al. . |
| 6,058,348 | * 5/2000 | Ohyama et al. ..................... 701/103 |

FOREIGN PATENT DOCUMENTS

| 39 28 814 A | 3/1991 | (DE) . |
|---|---|---|
| 43 32 456 A | 3/1995 | (DE) . |
| 0 479 464 A | 4/1992 | (EP) . |
| 98/01659 A | 1/1998 | (WO) . |

OTHER PUBLICATIONS

Japanese Patent Abstract, vol. 006, No. 106 (M–213) dated May 10, 1983 & JP 58 028049A (Toyota Jidosha Kogyo KK) dated Feb. 18, 1983.

\* cited by examiner

*Primary Examiner*—William A. Cuchlinski, Jr.
*Assistant Examiner*—Gertrude Arthur
(74) *Attorney, Agent, or Firm*—Davis & Bujold, P.L.L.C.

(57) ABSTRACT

A method for terminating a warm-up program of an automatic transmission driven by an internal combustion engine in which the engine operational capacity of the internal combustion engine is calculated and summed (S2, S3, S4) and the warm-up program is abandoned when the summed energy operational capacity (SUM(E)) exceeds a limit value (GW).

6 Claims, 1 Drawing Sheet

METHOD FOR CONTROLLING AN AUTOMATIC TRANSMISSION

Figure 1:
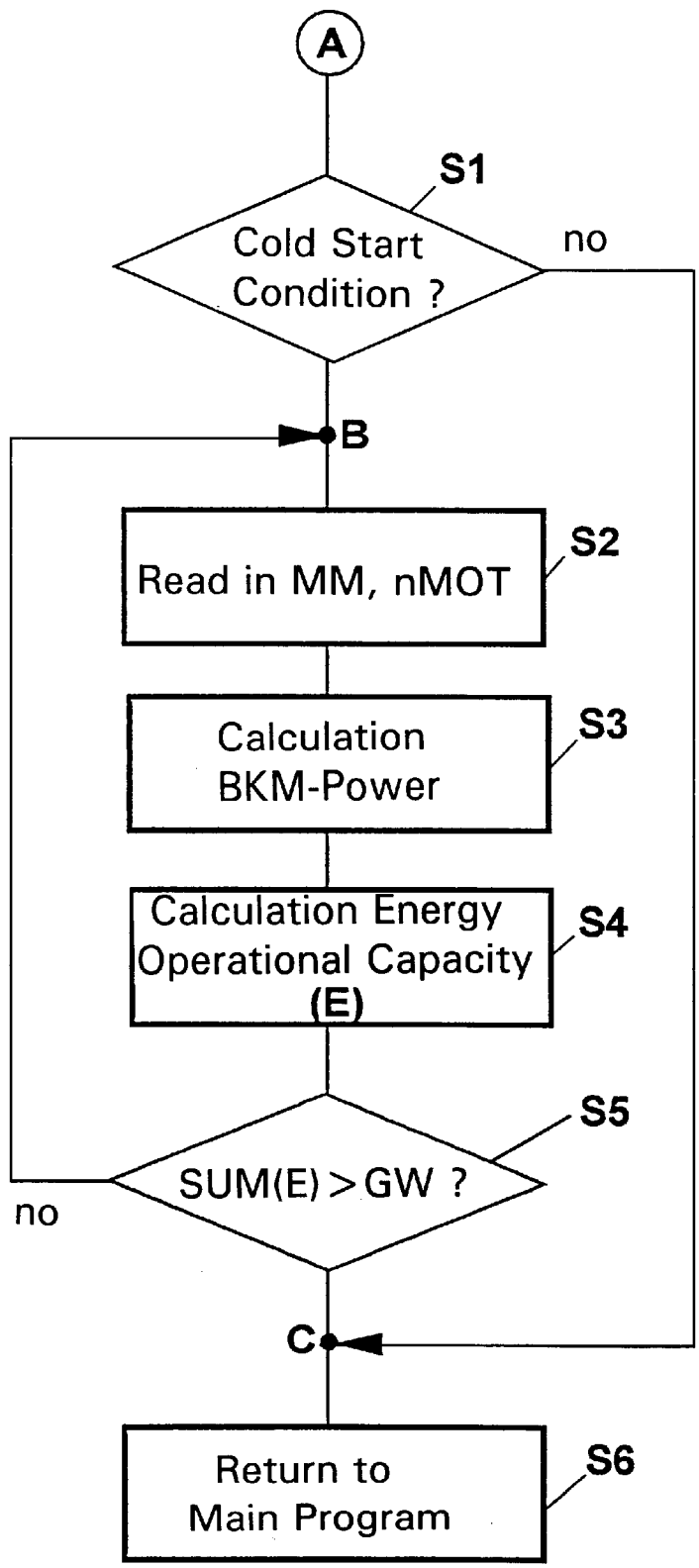

In the driving system of an internal combustion engine/automatic transmission, the internal combustion engine and the automatic transmission are each controlled by an electronic control unit. During the initial phase, i.e. when the driver intends to start the vehicle, the electronic engine control unit makes available via a data line to the electronic gear control the temperature of the internal combustion engine. With the aid of information, the electronic gear control tests whether a cold start condition exists. When a cold start condition exists, the electronic gear control selects a so-called warm-up program or allows only those shift programs having elevated shift points. The effect of the elevated shift points is that the internal combustion engine and the catalyst warm up more quickly and reach the operating temperature sooner.

FIG. 1 shows a preferred embodiment. The program flow can be tied in as sub-program in an existing gear control software.

The program flow begins at point A. In step S1 is tested whether a cold start condition exists. In case of negative result of the inquiry S1, i.e. the internal combustion engine has operating temperature, it is returned to the main program S6. A cold start condition exists, e.g. when the temperature of the cooling water, theta(BKM), of the internal combustion engine is below a limit value such as 35° C. Instead of the temperature of the cooling water, theta(BKM), of the internal combustion engine, there can obviously be used also the temperature of the automatic transmission fluid, theta(ATF), of the automatic transmission. When the cold start condition exists, the electronic gear control in step S2 reads in the actual engine torque MM and the actual rotational speed of the internal combustion engine nMOT. Both data values are usually made available by the electronic engine control unit via data line. Herefrom is calculated in step S3 the power generated by the internal combustion engine according to the equation.

$$P(i) = MM(i) \cdot nMOT(i) \cdot K$$

$$i = 1, 2 \ldots n$$

Wherein K means a constant for conversion. In step S4 the energy operational capacity is calculated from two calculated power values according to the equation $$E = (P(i) + P(i+1)) \cdot dt$$ of two consecutive power values.

Here dt means a fixedly preset inquiry cycle such as 100 ms. The energy operational capacity is summed up SUM(E). In step S5 is tested whether the sum of the energy operational capacity is above a limit value such as 2.5 kWh. If this is not the case, the program branches off to point B and continues with step S2. In step S5, if it is found that the energy operational capacity is above a limit value GW, i.e. the internal combustion engine and the catalyst have reached operating temperature, the main program is returned to in step S6.

The inventive solution offers the advantage that without impairing the exhaust gas behavior, it is possible to shift to the normal program. By normal program is to be understood the shift characteristic field (program) selected by the driver. In so-called intelligent shift program, by normal program is to be understood the shift characteristic field which, on the basis of the driver's behavior such as driving activity, the electronic gear control selects from a multiplicity of shift characteristic fields. One other advantage of the system consists in that in normal road operation a clearly higher energy operational capacity exists than in the exhaust gas test, i.e. the warm-up program can be abandoned substantially earlier than in purely time-controlled warm-up program.

Reference signs
S1 inquiry cols start condition
S2 read in MM engine torque nMOT internal combustion engine
S3 calculation power of the internal combustion engine
S4 calculation energy operational capacity
S5 inquiry energy operational capacity limit value
S6 return to the main program

What is claimed is:

1. A method for controlling an electrohydraulically actuated automatic transmission driven by an internal combustion engine in which an electronic gear control selects, according to at least one input variable, a shift characteristic program from one of a plurality of shift characteristic programs, the method comprising the steps of:
   a) detecting a cold start condition of the internal combustion engine;
   b) selecting a desired warm-up shift characteristic program from a plurality of warm-up shift characteristic programs which only allow relatively higher shift points;
   c) calculating, from a torque (MM) generated by the internal combustion engine and a rotational speed (nMOT) of the internal combustion, an actual power value $(P(i) = MM(i) \cdot nMOT(i) \cdot K)$;
   d) calculating an energy operational capacity (E) by summing up the actual power values (P(i)) over a predetermined period of time $(E = (P(i) + P(i+1)) \times dt)$; and
   e) deactivating the warm-up shift characteristic program, when a sum of the energy operational capacity (SUM (E)) exceeds a power limit value (GW), to thereafter only allow shift characteristic programs having relatively lower shift points.

2. The method according to claim 1, further comprising the step of defining the cold start condition to exist when a cooling fluid temperature of the internal combustion engine (theta(BKM)) is below a cooling fluid temperature limit value.

3. The method according to claim 1, further comprising the step of defining the cold start condition to exist when the temperature of the hydraulic fluid of the automatic transmission (theta (ATF)) is below a hydraulic fluid temperature limit value.

4. A method for controlling an electrohydraulically actuated automatic transmission driven by an internal combustion engine in which an electronic gear control selects, according to at least one input variable, a shift characteristic program from one of a plurality of shift characteristic programs, the method comprising the steps of:
   a) detecting a cold start condition of the internal combustion engine;
   b) selecting a desired warm-up shift characteristic program which only allows elevated shift points;

c) calculating, from a torque (MM) generated by the internal combustion engine and a rotational speed (nMOT) of the internal combustion, an actual power value (P(i)=MM(i)·nMOT(i)·K);
d) calculating an energy operational capacity (E) by summing up the actual power values (P(i)) over a predetermined period of time (E=(P(i)+P(i+1))×dt); and
e) deactivating the warm-up shift characteristic program when a sum of the energy operational capacity (SUM (E)) exceeds a power limit value (GW) whereby only shift characteristic programs which have shift points below the elevated shift points of the desired warm-up shift characteristic program are permitted.

5. The method according to claim 4, further comprising the step of defining the cold start condition to exist when a cooling fluid temperature of the internal combustion engine (theta(BKM)) is below a cooling fluid temperature limit value.

6. The method according to claim 4, further comprising the step of defining the cold start condition to exist when the temperature of the hydraulic fluid of the automatic transmission (theta (ATF)) is below a hydraulic fluid temperature limit value.

* * * * *